United States Patent [19]

Kogita et al.

[11] Patent Number: 5,337,190

[45] Date of Patent: Aug. 9, 1994

[54] RETRACTABLE REAR UNDER VIEW MIRROR SYSTEM FOR AN AUTOMOTIVE VEHICLE

[75] Inventors: Hidekazu Kogita, Kariya; Masumi Nishikawa, Toyoake; Shoji Okada, Anjo, all of Japan

[73] Assignee: Aisin Seiki Kabushiki Kaisha, Kariya, Japan

[21] Appl. No.: 111,957

[22] Filed: Aug. 26, 1993

[30] Foreign Application Priority Data

Aug. 31, 1992 [JP] Japan ................. 4-232149

[51] Int. Cl.$^5$ ............................... G02B 7/182
[52] U.S. Cl. .................... 359/877; 359/843; 359/841; 359/872
[58] Field of Search ............... 359/843, 841, 877, 872

[56] References Cited

U.S. PATENT DOCUMENTS

| | | | |
|---|---|---|---|
| 4,469,405 | 9/1984 | Chin-Wun | 359/841 |
| 4,936,670 | 6/1990 | Yoo | 359/841 |
| 5,056,904 | 10/1991 | Okamura | 359/841 |

FOREIGN PATENT DOCUMENTS

| | | | |
|---|---|---|---|
| 2663595 | 12/1991 | France | 359/877 |
| 0050834 | 3/1984 | Japan | 359/877 |
| 0146653 | 7/1986 | Japan | 359/841 |
| 62-4441 | 1/1987 | Japan . | |
| 1-127430 | 5/1989 | Japan . | |
| 0208143 | 8/1990 | Japan | 359/843 |
| 3-28342 | 4/1991 | Japan . | |
| 4039140 | 2/1992 | Japan | 359/877 |

*Primary Examiner*—Loha Ben
*Assistant Examiner*—Thomas Robbins
*Attorney, Agent, or Firm*—Burns, Doane, Swecker & Mathis

[57] ABSTRACT

The invention is directed to a retractable rear under view mirror system for an automotive vehicle, mounted rearward thereof for ensuring a rear under field of view from a driver's seat. There is provided a base member rearward of the automotive vehicle. A mirror assembly is movably supported by the base member, and selectively positionable from a stored position to a use position. An actuator is provided for actuating the mirror assembly to be positioned in the stored position or the use position. A detector is provided for detecting at least an operating condition of a component out of the components of the automotive vehicle. The actuator is controlled by a controller in response to an output of a detector to move the mirror assembly to a position responsive to the operating condition of the component. The controller is arranged to determine an output state of the detector, and determine a relative position of the mirror assembly to the base member, and arranged to control the actuator in response to the relative position and the output state.

11 Claims, 13 Drawing Sheets

RETRACTABLE REAR UNDER VIEW MIRROR SYSTEM FOR AN AUTOMOTIVE VEHICLE

BACKGROUND OF THE INVENTION

1. Field of the Invention

The present invention relates to a retractable rear under view mirror system provided rearward of an automotive vehicle for ensuring a rear under field of view from a driver's seat of the vehicle, and more particularly to the retractable rear under view mirror system which is positionable in a stored position where a mirror assembly is stored at a rear upper portion of the vehicle, and a use position where the mirror assembly is extended.

2. Description of the Prior Art

A retractable rear under view mirror system has been proposed in a Japanese Patent Laid-open Publication No. 1-127430 for example to improve a configuration of a van-type automotive vehicle, wherein a rear under view mirror is fixedly secured to an external surface of the vehicle to extend rearward thereof. In the mirror system disclosed in this publication, there is formed a recess at a rear end portion of the van-type vehicle which has a rear door hinged at its upper portion. A mirror assembly is retractably disposed in the recess, and actuated by a mirror actuating device to be extended out of the recess for ensuring the rear under field of view from the driver's seat. The mirror actuating device is energized by a manual switch operated by the driver of the vehicle. As an embodiment, there is provided a spoiler for reducing a lift created at a rear portion of the vehicle, or a deflector, and the recess is formed in the spoiler for receiving the mirror assembly.

In Japanese Patent Publication for opposition No. 3-28342, is proposed an apparatus for ensuring a rear under view of a vehicle, which includes a movable stay mounted rearward of the vehicle, a mirror fixed to one end of the stay, a clutch for holding the stay at a certain position and releasing it when an extraordinary force is applied to the stay, a mirror driving mechanism for moving the mirror between the certain position and a retracted position, a manual switch for moving the mirror as intended by a driver, and a control device. According to this control device, the mirror will be moved from the retracted position to the certain position, when a transmission has been shifted to a reverse gear and then the manual switch has been operated. Whereas, the mirror will not be moved, when the transmission has been shifted to the reverse gear after the manual switch was operated, but will be moved if the manual switch is operated for moving the mirror to the retracted position. Thus, in this apparatus, the manual switch has a priority for moving the mirror.

Also, in Japanese Utility model laid-open Publication No. 62-4441, a retractable rear mirror apparatus for a van-type vehicle, or a truck having a box-type rear body or the like is proposed. In this apparatus, a mirror stay is rotated by a motor in response to operation of a manual switch at a driver's seat to move a rear mirror from its retracted position to a certain position, and hold the mirror at a certain angle by means of a swingable bracket, a spring for biasing the bracket to rotate, and a stopper for positioning the bracket. When the mirror is retracted, the mirror is rotated by a biasing force of a spring to be positioned at an appropriate angle for retracting movement.

However, according to the above-described rear under view mirror apparatus, it is necessary for a driver to operate the manual switch in order to move the mirror. In other words, the actuating apparatus for moving the mirror in the normal direction or the reverse direction has not been fully automated. Therefore, its operationability is to be improved. The driver may not move the mirror as desired. For example, the driver may leave the vehicle with the mirror extended.

SUMMARY OF THE INVENTION

Accordingly, it is an object of the present invention to provide a retractable rear under view mirror system for an automotive vehicle, mounted rearward thereof for ensuring a rear under field of view from a driver's seat, which automatically positions a mirror assembly from its stored position to its use position and vice versa.

In accomplishing the above and other objects, a retractable rear under view mirror system is installed in an automotive vehicle and mounted rearward of the vehicle for ensuring a rear under field of view from a driver's seat. The system includes a base member which is provided rearward of the automotive vehicle, a mirror assembly which is movably supported by the base member, and selectively positionable from a stored position to a use position, and an actuator for actuating the mirror assembly to be positioned in the stored position or the use position. A detector is provided for detecting at least an operating condition of a component out of components of the vehicle. And, a controller is provided for controlling the actuator to move the mirror assembly to a position responsive to the operating condition of the component. The controller is arranged to determine an output state of the detector, and determine a relative position of the mirror assembly to the base member, and arranged to control the actuator in response to the relative position and the output state.

In the above-described retractable rear under view mirror system, the base member may be formed by a deflector which is mounted on the automotive vehicle in a spaced relationship therewith for deflecting air flow to the rear door. The deflector may be mounted on the rear door at an upper portion thereof.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
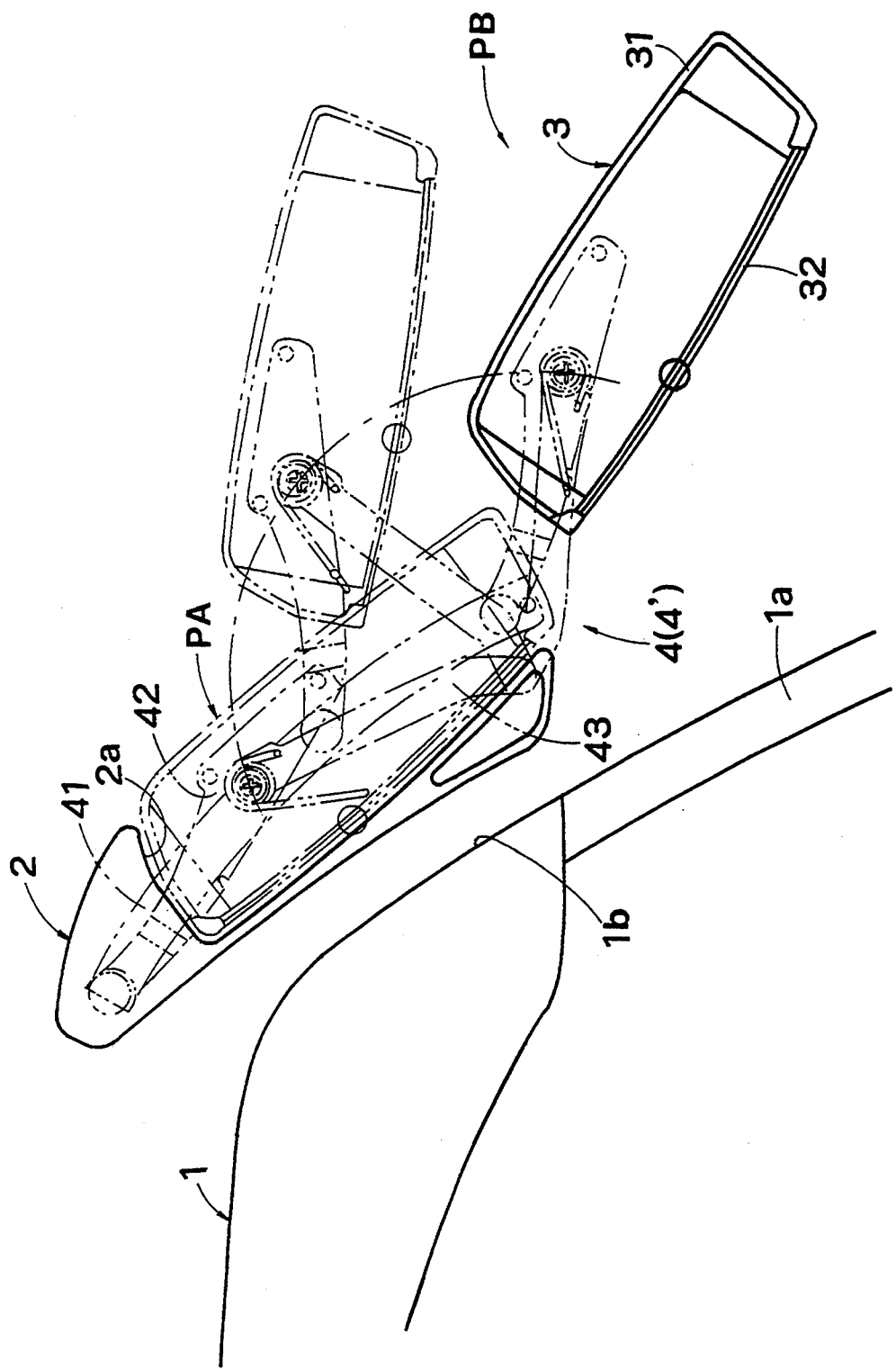
FIG. 1 is a side view of a retractable rear under view mirror system illustrating an operation thereof according to the present invention.
Figure 2:
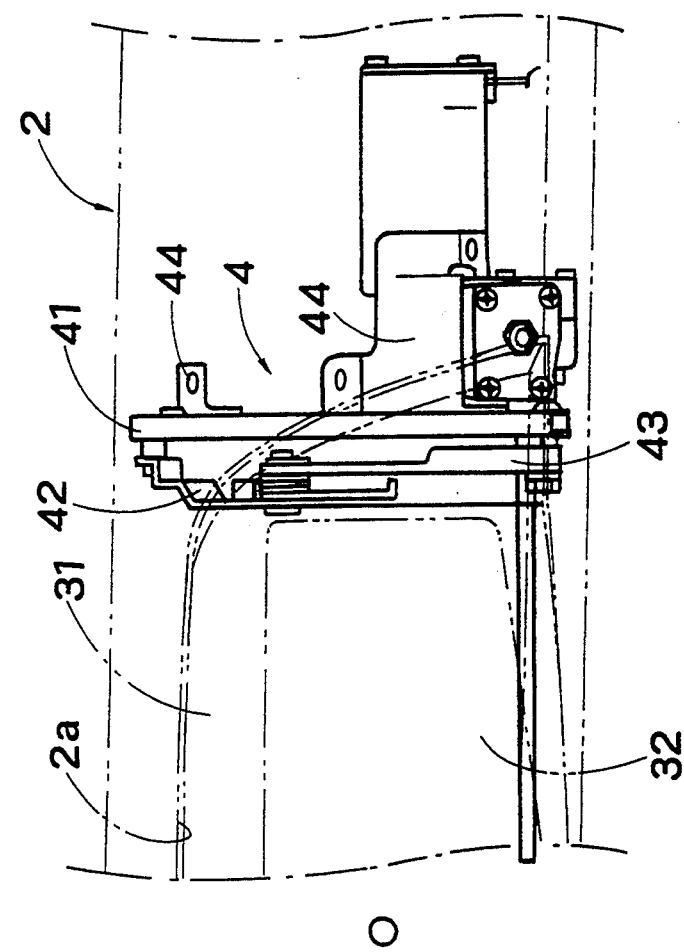
FIG. 2 is a front view of a retractable rear under view mirror system of an embodiment of the present invention.
Figure 2:
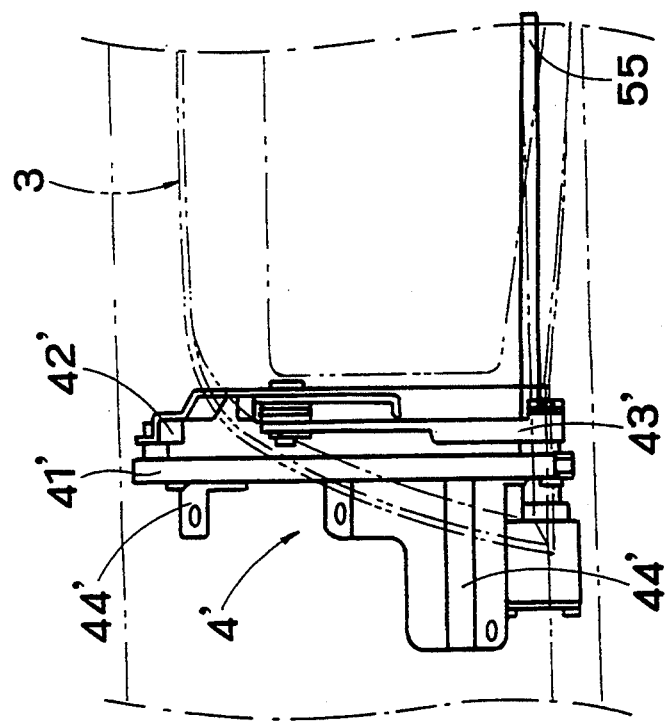
Figure 3:
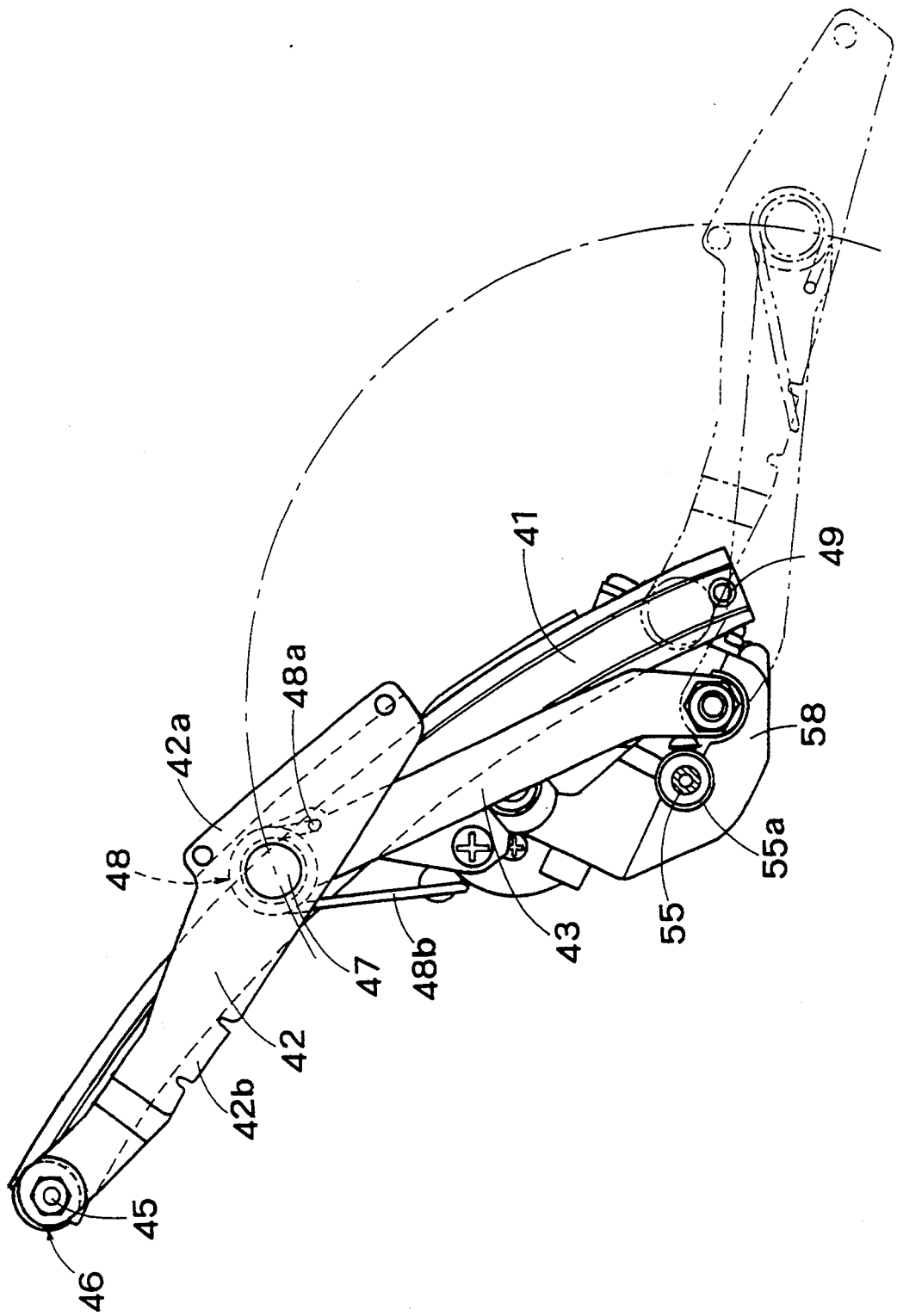
FIG. 3 is a side view of a supporting mechanism of the retractable rear under view mirror system according to the above embodiment.
Figure 13:
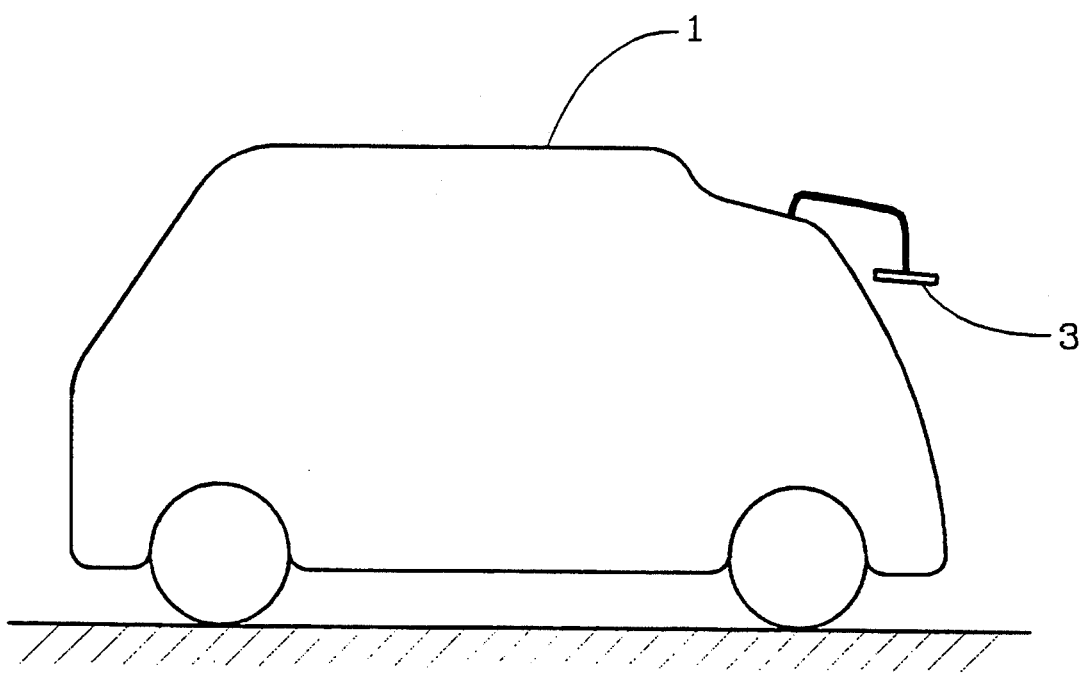
FIG. 13 is a side view of one type of automotive vehicle illustrating the location of the retractable rear under view mirror system of the present invention.

As shown in FIGS. 1 and 2, a hollow deflector 2 is fixed to an upper portion of a rear door 1b which is disposed rearward of a vehicle 1 and provided with a window pane 1a. The deflector 2 is provided in spaced relationship with the rear door 1b for guiding an air flow which is produced when the vehicle 1 is running, to reduce the air resistance caused by the air flow and applied to the vehicle 1, or provided for blowing the air to the window pane 1a to sweep the window pane 1a, i.e., to blow off rain drops or the like. On this deflector 2 is mounted a movable member 3 which is movably supported by a supporting mechanism 4 described later. The movable member 3 is selectively positionable from a stored position PA, where it is retracted into a recess 2a formed on the reflector 2, to a use position PB, where it is extended out of the deflector 2, in response to movement of the supporting mechanism 4. FIG. 13 illustrates the movable member 3 in the use position PB as mounted on one possible type of automotive vehicle 1.

As shown in FIGS. 1 and 2, the movable member 3 includes a main body 31 which forms a part of the outer surface of the deflector 2 in the stored position PA, and a mirror 32 which is concealed by the deflector 2 and the main body 31 in the stored position PA and which reflects the rear under view of the vehicle 1 in the use position PB. The supporting mechanisms 4, 4' are provided at the opposite sides of the movable member 3, and include guide rails 41, 41' which are fixed to the deflector 2 first links 42, 42' which are slidably supported by the guide rails 41, 41' and fixed to the movable member 3, and second links 43, 43' which are supported by the first links 42, 42' and operatively connected with a driving mechanism 5 which will be described later. The supporting mechanism 4' is substantially the same as the supporting mechanism 4, so that the explanation will be made mostly about the latter for the purpose of simplicity.

As shown in FIGS. 2-6, the guide rail 41 extends from the top to the bottom (upward in FIG. 1) of the deflector 2, and forms an arc configuration longitudinally, with a substantially C-shaped cross section. This guide rail 41 is secured by screws (not shown) within the deflector 2 through a bracket 44. On one end portion of the first link 42 is mounted a pin 45 which extends within the cross sectional configuration of the guide rail 41, and around which a roller 46 is rotatably mounted. The roller 46 is also slidably mounted on the guide rail 41. On the other end portion of the first link 42 is formed a bracket portion 42a which is secured to the main body 31 of the movable member 3. On the guide rail 41, a stopping member 49 is fixed to be engageable with the roller 46. When the roller 46 is engaged with the stopping member 49, the sliding movement of the first link 42 along the guide rail 41 will be restricted. One end of the second link 43 is rotatably mounted on the first link 42 by a pin 47. A spring 48 is disposed around the pin 47, such that its one end 48a is engageable with an engaging hole formed in the second link 43 and its opposite end 48b is engageable with a flange portion 42b formed on the first link 42.

Figure 4:
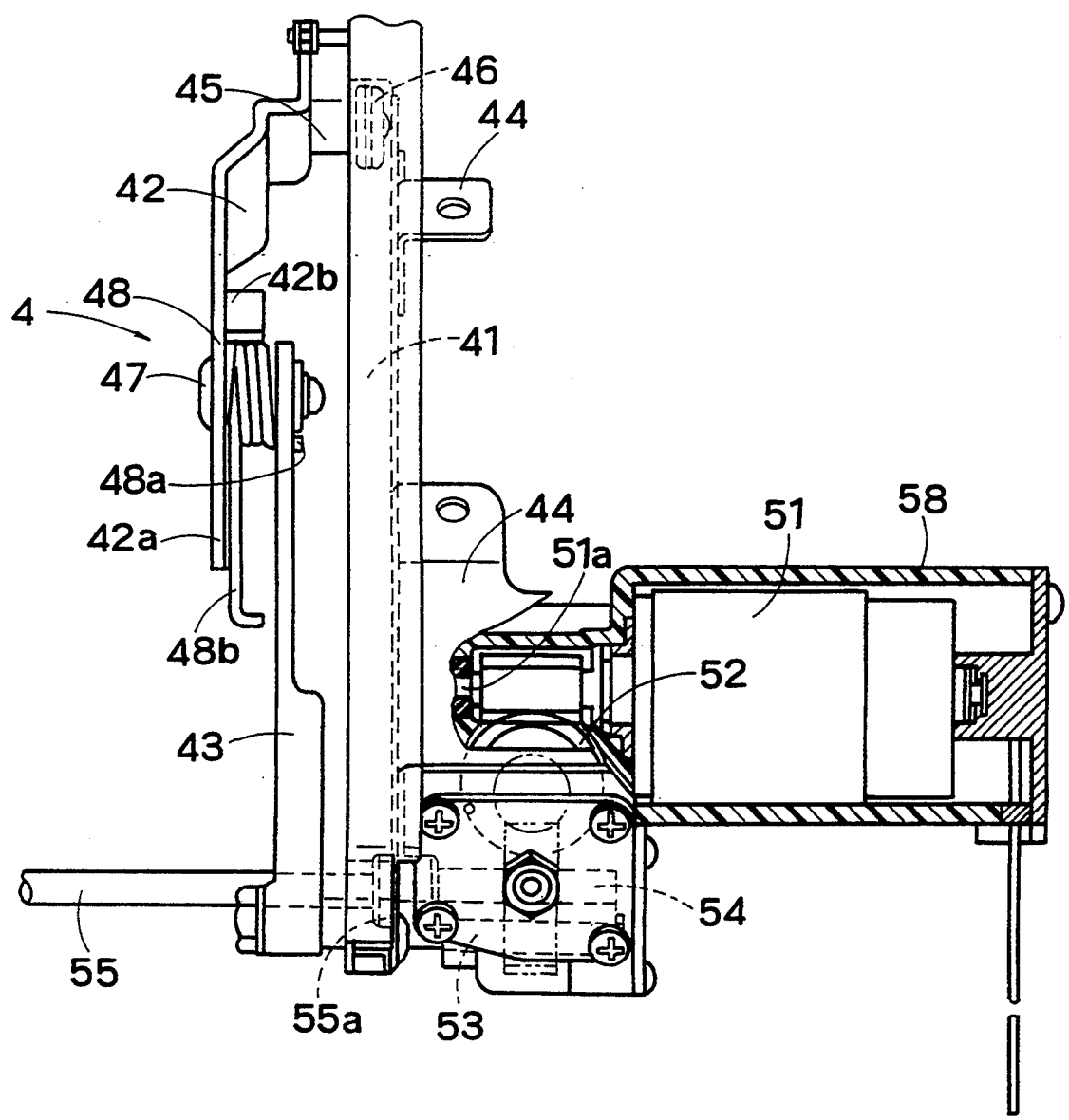
FIG. 4 is a partially sectioned front view of the retractable rear under view mirror system according to the above embodiment.
Figure 5:
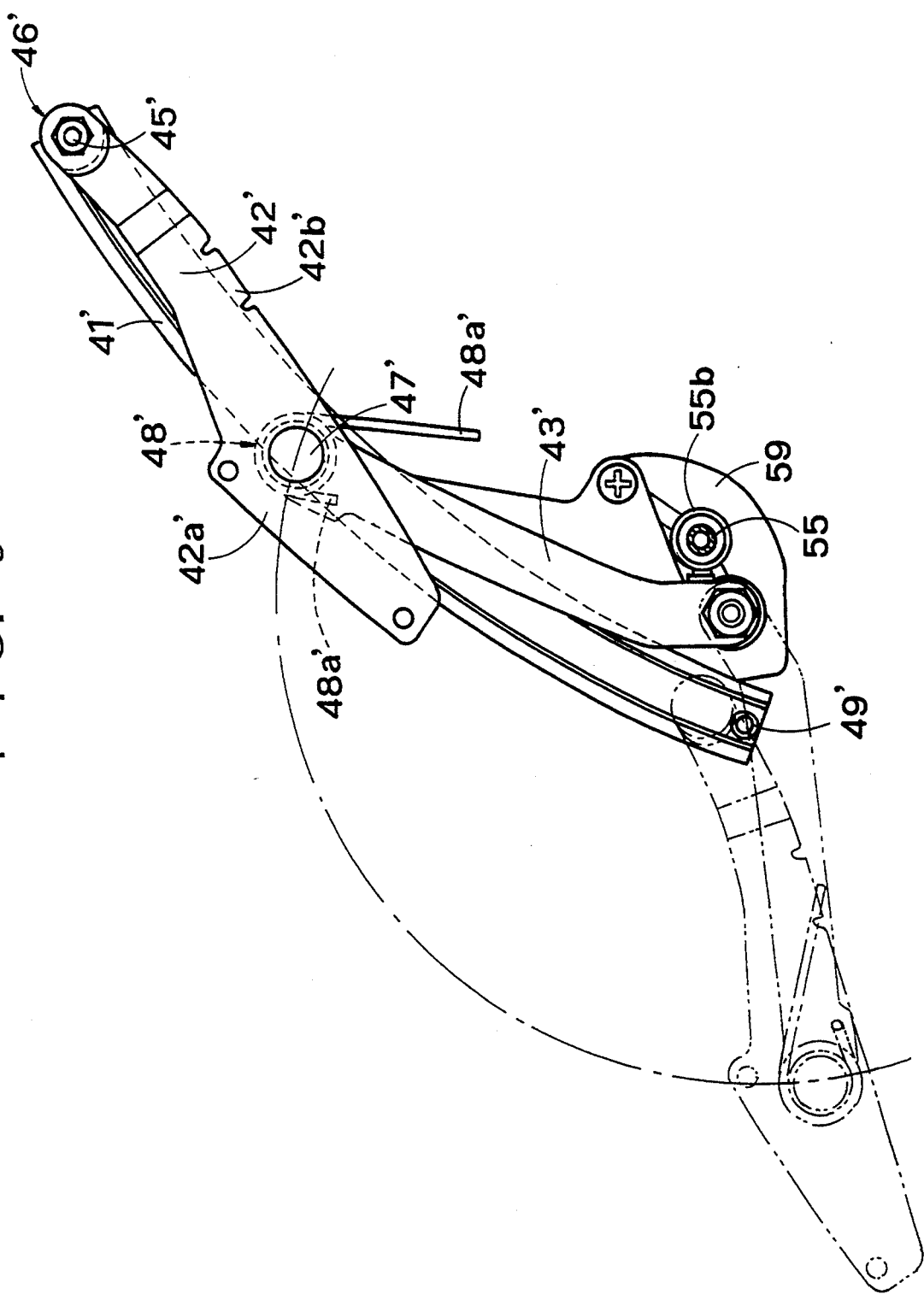
FIG. 5 is a side view of another supporting mechanism of the retractable rear under view mirror system according to the above embodiment.
Figure 6:
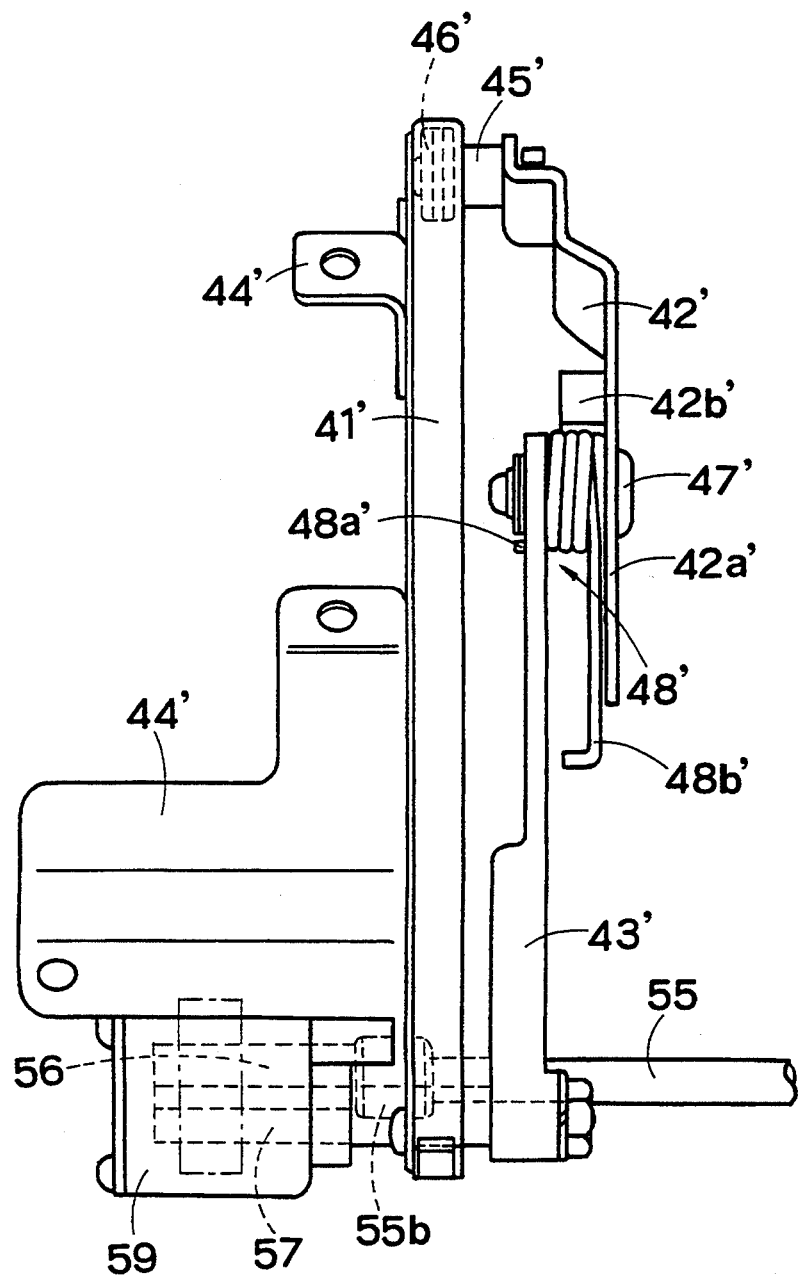
FIG. 6 is a front view of another supporting mechanism of the retractable rear under view mirror system according to the above embodiment.

The driving mechanism 5 has a motor 51 as shown in FIG. 4. An output shaft 51a of the motor 51 is linked with a first output shaft 53 and a second output shaft 54 through a known gear mechanism 52 which includes a plurality of gears for providing a decelerating function. The first output shaft 53 is linked with the other end portion of the second link 43 of the supporting mechanism 4. The second output shaft 54 is linked with the other end portion of the second link 43' of the supporting mechanism 4', through a connecting shaft 55 which is secured to the second output shaft 54 by a collar 55a, an input shaft 56 which is secured to the connecting shaft 55 by a collar 55b, and a third output shaft 57 meshed with the input shaft 56. The motor 51, gear mechanism 52, first output shaft 53 and second output shaft 54 are received and supported within a case 58 which is secured to the bracket 44, and located within the deflector 2 at the side of the supporting mechanism 4. The input shaft 56 and third output shaft 57 are received and supported within a case 59 which is secured to the bracket 44', and located within the deflector 2 at the side of the supporting mechanism 4'. The connecting shaft 55 is located within the deflector 2 longitudinally along the movable member 3.

In the stored position PA where the movable member 3 is retracted within the deflector 2 as shown in FIG. i, when the motor 51 is rotated in the normal direction, the first output shaft 53 and second output shaft 54 are rotated through the gear mechanism 52. The rotation of the first output shaft 53 is transmitted to the supporting mechanism 4, and the rotation of the second output shaft 54 is transmitted to the supporting mechanism 4', through the connecting shaft 55, input shaft 56 and third output shaft 57, so that the supporting mechanisms 4 and 4' will move together. When the supporting mechanisms 4, 4' are actuated to move, the second links 43, 43' rotate clockwise in FIG. 1 in response to rotation of the first output shaft 53 and third output shaft 57. Then, the first links 42, 42' are elevated counterclockwise in FIG. 1, sliding downward in FIG. 1 along the guide rails 41, 41' whereby the movable member 3 extends along a short locus adjacent to the deflector 2, with its angle controlled, to be extended out of the deflector 2 and held in the use position PB as shown in FIG. 1. Consequently, the rear under field of the vehicle 1 is reflected by the mirror 32 of the movable member 3 to ensure the rear under view from driver's seat of the vehicle 1. Therefore, it is useful for the driver to observe the rearward field of view when he drives the vehicle 1 backward. In this respect, the first links 42, 42' engage with the end portion 48b of the spring 48 to deform the spring 48, and rotate clockwise in FIG. 1, sliding downward in FIG. 1.

In the use position PB where the movable member 3 is extended out of the deflector 2, when the motor 51 is rotated in the reverse direction, the supporting mechanisms 4, 4' move in the same manner as described above, and the second links 43, 43' rotate counter-clockwise in FIG. 1 in response to rotation of the first output shaft 53 and third output shaft 57. Then, the first links 42, 42' are elevated clockwise in FIG. 1, sliding upward in FIG. 1 along the guide rails 41, 41'. Consequently, the movable member 3 extends along the short locus adjacent to the deflector 2, with its angle controlled, to be retracted within the deflector 2 and held at the stored position PA as shown in FIG. 1. In this case, the first links 42, 42' have been applied with biasing force by the deformed spring 48, whereby the first links 42, 42' rotate counter-clockwise in FIG. I, sliding upward in FIG. 1. In the above-described embodiment, the deflector 2 serves as a base member, the movable member 3 serves as a mirror assembly, and the supporting mechanism 4(4') and driving mechanism 5 serve as actuating means or an actuator.

Figure 7:
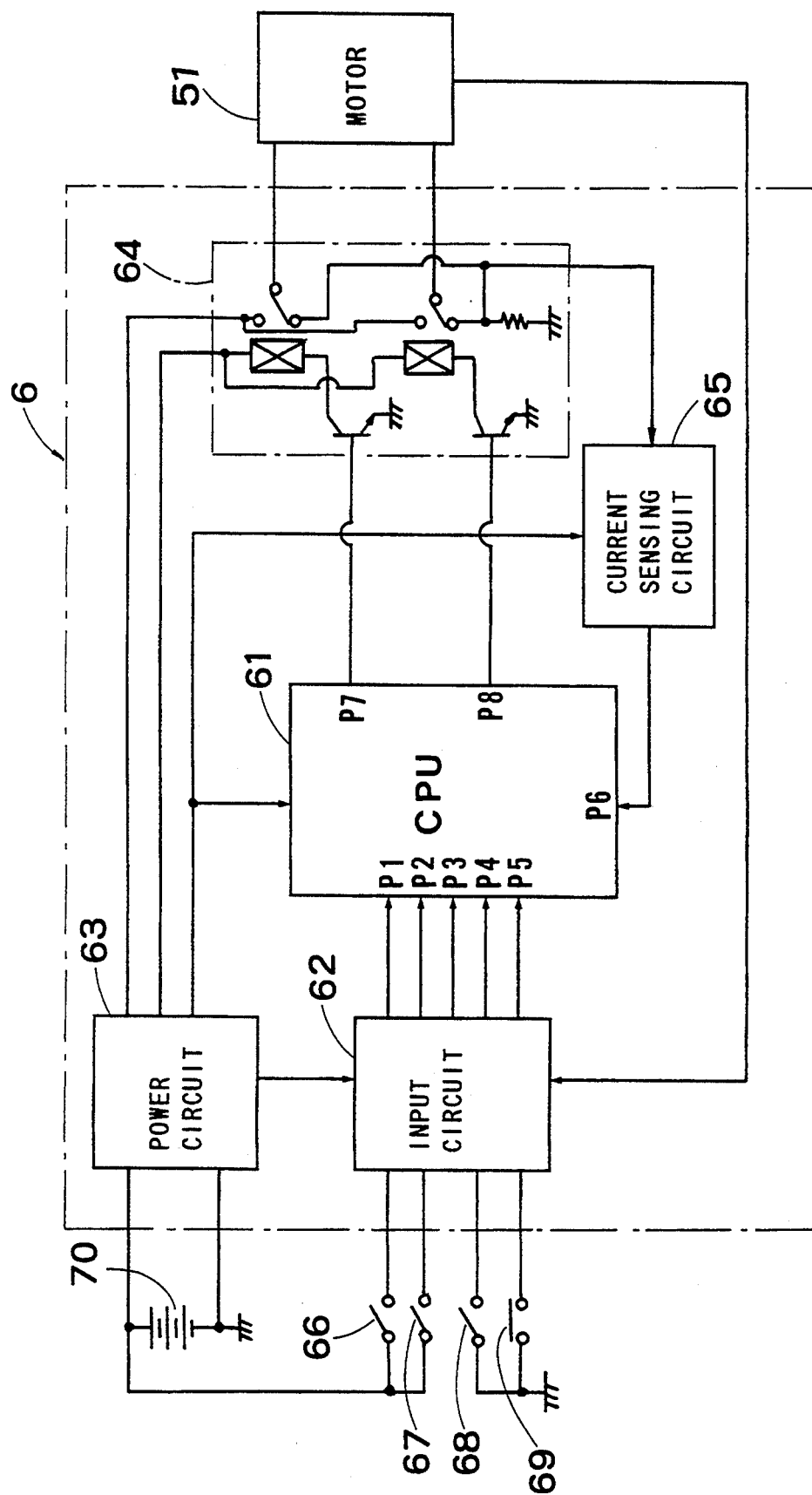
FIG. 7 is a block diagram showing a controller of the above embodiment.

Next, referring to FIG. 7, a controller, or control circuit 6 will be explained. It includes a central processing unit (CPU) 61, an input circuit 62, a power circuit 63, a driving circuit 64 and a current sensing circuit 65. The CPU 61 has input ports P1–P5, the input ports P1, P2, P3 and P4 of which are electrically connected to a reverse switch 66, an ACC switch 67, a forward movement detection switch 68 and a manual switch 69, respectively, through an input circuit 62, to which a driving signal is fed in response to each switch 66, 67, 68, 69. The reverse switch 66 is provided in a known transmission (not shown) of the vehicle 1 for controlling the motor 51 to rotate in the normal direction or reverse direction. The reverse switch 66 is arranged to be turned on when the transmission is selected to be positioned in the reverse position, where the vehicle 1 is driven backward, and turned off in other positions. The ACC switch 67 is of a known type which is operatively associated with a known ignition apparatus (not shown). The ACC switch 67 is provided for controlling the motor 51 to rotate in the reverse direction, and arranged to be turned on when the ignition apparatus is selected to start the engine operation, otherwise turned off. The forward movement detection switch 68 is provided for controlling the motor to rotate in the reverse direction, and activated in response to an output from a known sensor (not shown) operatively mounted on a tire (not shown) of the vehicle 1, which sensor has the switch 68 built-in. Thus, each switch of a component like the transmission serves as detection means or a detector. The switch 68 is arranged to be turned on when the vehicle 1 moves forward, and turned off when the vehicle 1 moves backward or stops. The manual switch 69 is provided on an instrument panel (not shown) installed in the vehicle 1, and provided for controlling the motor 51 to rotate in the normal direction and reverse direction. When the driver presses the manual switch 69, it is turned on momentarily and then automatically returned to its off state.

A rotational sensor (not shown) installed within the motor 51 is electrically connected to the input port P5 of the CPU 61 through the input circuit 62, a signal for representing a relative position of the movable member 3 with respect to the deflector 2 is fed to the input port P5 in response to the rotational speed of the motor 51 detected by the rotational sensor. The input port P6 of the CPU 61 is electrically connected to the current sensing circuit 66 which is connected to the motor 51, and which determines by a current fed to the motor 51 whether an overload is caused in the motor 51, and outputs a resultant signal to the input port P6. The output ports P7, P8 of the CPU 61 are electrically connected to the motor 51 through the driving circuit 64. The power circuit 63 is electrically connected to a battery 70 which is installed in the vehicle 1, and connected to the CPU 61, input circuit 62, driving circuit 64 and current sensing circuit 65 to supply an electric power to each circuit.

Figure 8:
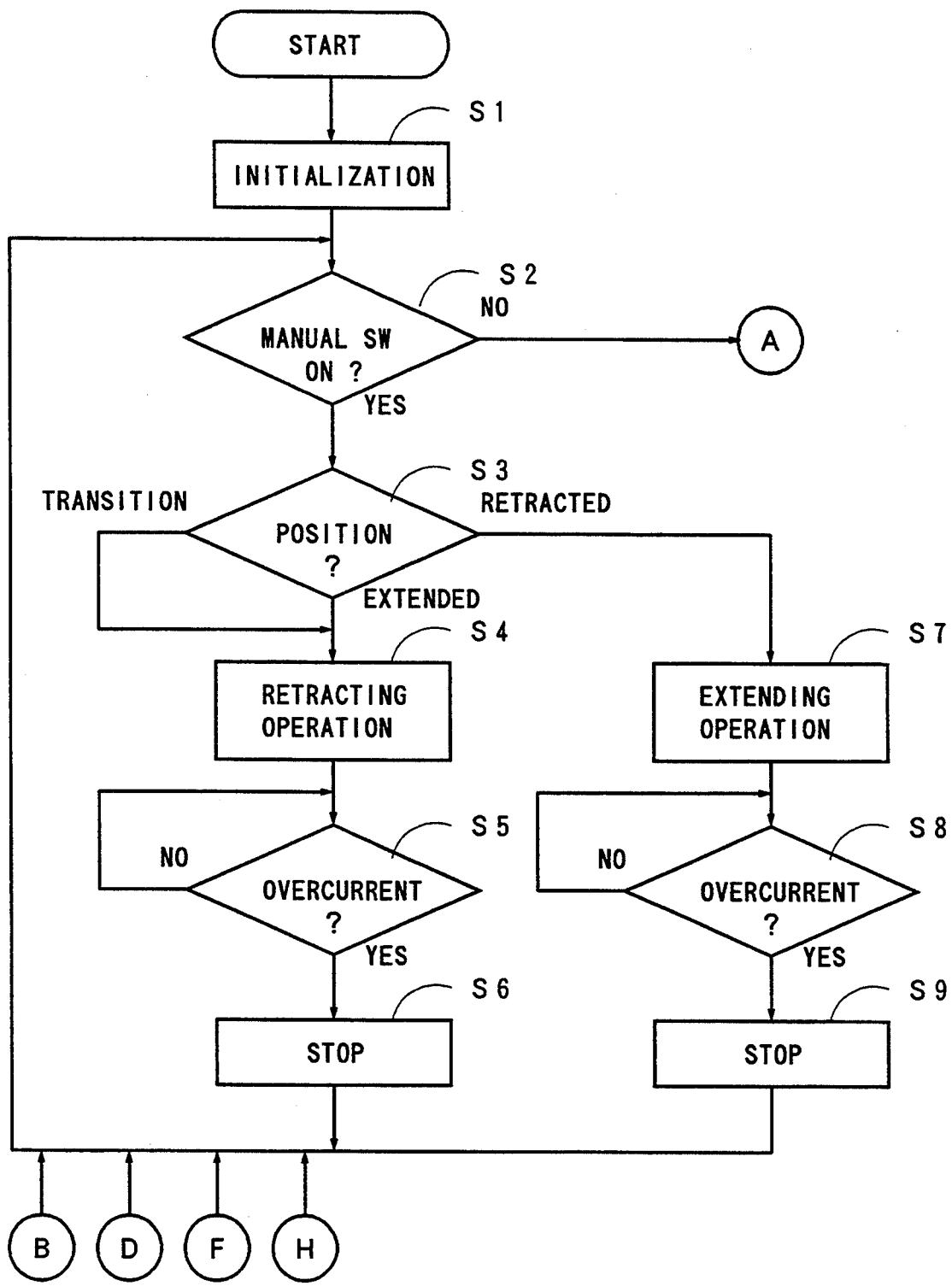
FIG. 8 is a flow chart showing an operation of the controller in the above embodiment.

The above-described control circuit 6 operates in accordance with a program corresponding to the flow chart of FIG. 8, which will be explained hereinafter. At Step S1, an initialization of the CPU 61 is executed to position the movable member 3 in its stored position PA. Then, the program proceeds to Step S2 where it is determined whether the manual switch 69 has been pressed (i.e., ON) or not (i.e., OFF). If the manual switch 69 is ON, so that the driving signal is fed to the input port P4 through the input circuit 62, then the program proceeds to Step S3 where it is determined in which position the movable member 3 is positioned, out of its retracted position corresponding to the stored position PA, its extended position corresponding to the use position PB and its transitional position. If it is determined at Step S3 that the movable member 3 is in its extended position or transitional position, a signal for rotating the motor 51 in the reverse direction is fed from the output ports P7, P8 to the driving circuit 64 at Step S4. Then, the motor 51 is rotated in the reverse direction, in response to that signal to initiate the retracting operation of the movable member 3. When the main body 31 of the movable member 3 engages with the wall defining the recess 2a of the deflector 2 to restrict movement of the movable member 3, the motor 51 will be supplied with overcurrent to operate in the overload condition, which will be detected by the current sensing circuit 65 to output a signal representing the overload (referred to overload signal, hereinafter). Accordingly, if it is determined at Step S5 that the motor 51 is in the overload condition, the overload signal is fed to the input port P6 of the CPU 61, the program proceeds to Step S6 where a signal for stopping the motor 51 is fed from the output ports P7, P8 to the driving circuit 64 in response to the overload signal. Consequently, the motor 51 stops at Step S6, so that the retracting operation of the movable member 3 is terminated. Thus, the movable member 3 is retracted into the deflector 2 to be positioned in its stored position PA, and the program returns to Step S2.

At Step S3, if it is determined that the movable member 3 is positioned in its retracted position, the program proceeds to Step S7 where the signal for rotating the motor 51 in the normal direction is fed from the output ports P7, P8 to the driving circuit 64, and in response to this signal the motor 51 is rotated in the normal direction to initiate the extending operation of the movable member 3. When the stopping member 49 engages with the roller 46 to restrict the sliding movement of the first link 42 along the guide rail 41, the motor 51 will be supplied with overcurrent to operate in the overload condition, which will be detected by the current sensing circuit 65 to output the overload signal. Accordingly, if it is determined at Step S8 that the motor 51 is in the overload condition, the overload signal is fed to the input port P6 of the CPU 61, the program proceeds to Step S9 where the signal for stopping the motor 51 is fed from the output ports P7, P8 to the driving circuit 64 in response to the overload signal. Consequently, the motor 51 stops, so that the extending operation of the movable member 3 is terminated. Thus, the movable member 3 is extended out of the deflector 2 to be positioned in its use position PB, where the rear under view of the vehicle 1 may be reflected by the mirror 32, and the program returns to Step S2.

Figure 9:
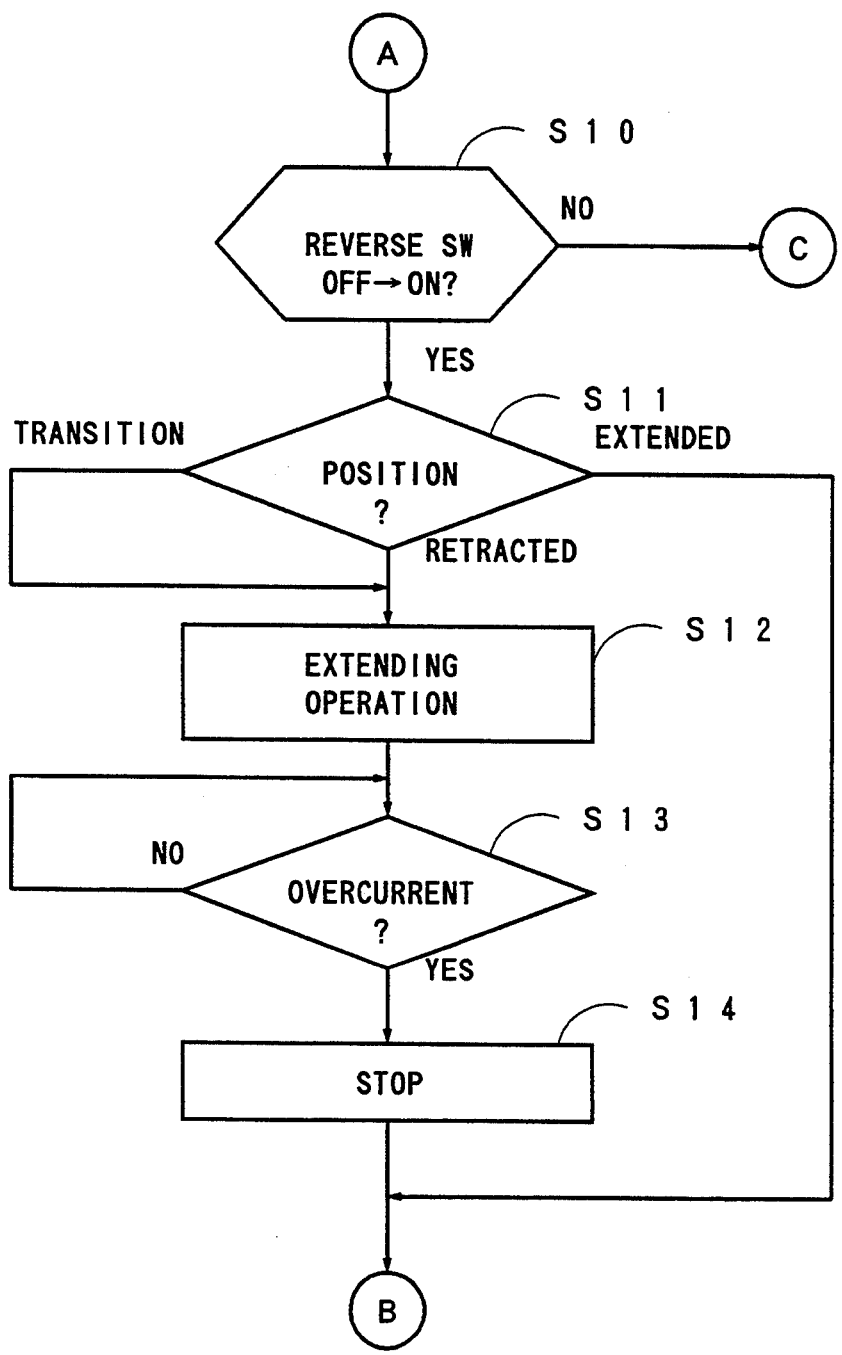
FIG. 9 is a flow chart showing the operation according to the above embodiment.

In the case where it is determined at Step S2 that the manual switch 69 is OFF, then the program proceeds to Step S10 in FIG. 9 where it is determined whether the reverse switch 66 has been switched from OFF to ON with the transmission shifted to the reverse position. If the reverse switch 66 has been switched from OFF to ON, so that the driving signal is fed to the input port P1 through the input circuit 62, then the program proceeds to Step S11 where it is determined in which position the movable member 3 is positioned, out of its retracted position corresponding to its stored position PA, its extended position corresponding to its use position PB and its transitional position. If it is determined at Step S11 that the movable member 3 is positioned in its retracted position or transitional position, the program proceeds to Step S12 where the signal for rotating the motor 51 in the normal direction is fed from the output ports P7, P8 to the driving circuit 64. In response to this signal, the extending operation of the movable member 3 is achieved at Step S12 and terminated at Steps S13, S14, as executed at Steps S7-S9. Consequently, the movable member 3 is extended out of the deflector 2 to be positioned in its use position PB, where the rear under view of the vehicle 1 may be reflected by the mirror 32.

Figure 10:
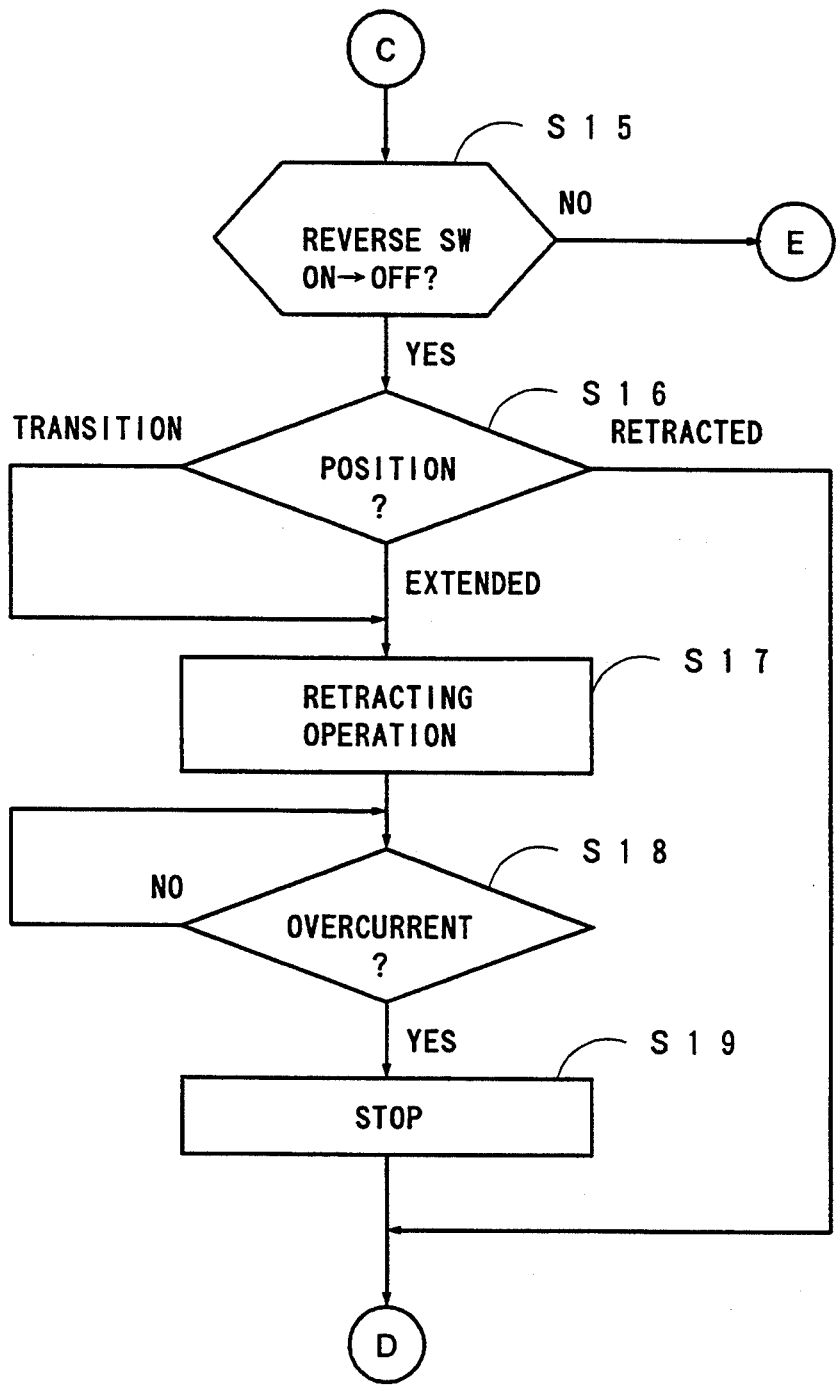
FIG. 10 is a flow chart showing the operation according to the above embodiment.

If it is determined at Step S10 that the reverse switch 66 has not been switched from OFF to ON, the program proceeds to Step S15 in FIG. 10 where it is determined whether the reverse switch 66 has been switched from ON to OFF with the transmission released from the reverse position. If the reverse switch 66 has been switched from ON to OFF, so that the driving signal is fed to the input port P1 through the input circuit 62, then program proceeds to Step S16 where in response to the relative position signal fed to the input port P5, it is determined in which position the movable member 3 is positioned, out of its retracted position corresponding to its stored position PA, its extended position corresponding to its use position PB and its transitional position. If it is determined at Step S16 that the movable member 3 is positioned in its extended position or transitional position, the program proceeds to Step S17 where the signal for rotating the motor 51 in the reverse direction is fed from the output ports P7, P8 to the driving circuit 64. In response to this signal, the retracting operation of the movable member 3 is achieved at Step S17 and terminated at Steps S18, S19 as executed at Steps S4-S6 Consequently, the movable member 3 is retracted into the deflector 2 to be positioned in its stored position PA as shown in FIG. 1.

Figure 11:
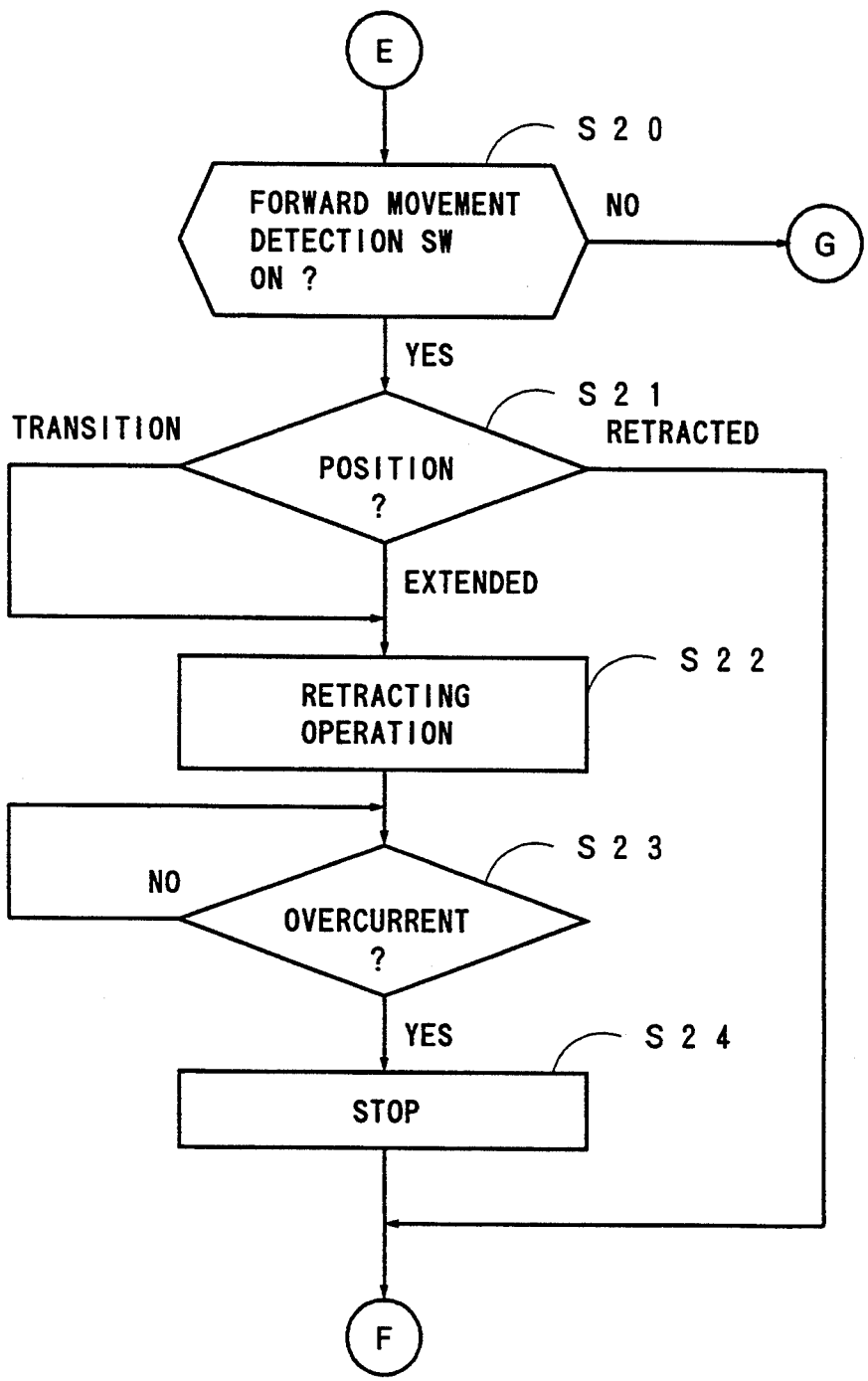
FIG. 11 is a flow chart showing the operation according to the above embodiment.

If it is determined at Step S15 that the reverse switch 66 has not been switched from ON to OFF, the program proceeds to Step S20 in FIG. 11 where it is determined whether the forward movement detection switch 68 is ON or not. If the switch 68 is ON, so that the driving signal is fed to the input port P3 through the input circuit 62, then the program proceeds to Step S21 where in response to the relative position signal fed to the input port PS, it is determined in which position the movable member 3 is positioned, out of its retracted position corresponding to its stored position PA, its extended position corresponding to its use position PB and its transitional position. If it is determined at Step S21 that the movable member 3 is positioned in its extended position or transitional position, the program proceeds to Step S22 where the signal for rotating the motor 51 in the reverse direction is fed from the output ports P7, P8 to the driving circuit 64. In response to this signal, the retracting operation of the movable member 3 is achieved at Step S22 and terminated at Steps S23, S24, as executed at Steps S4-S6. Consequently, the movable member 3 is retracted into the deflector 2 to be positioned in its stored position PA as shown in FIG. 1.

Figure 12:
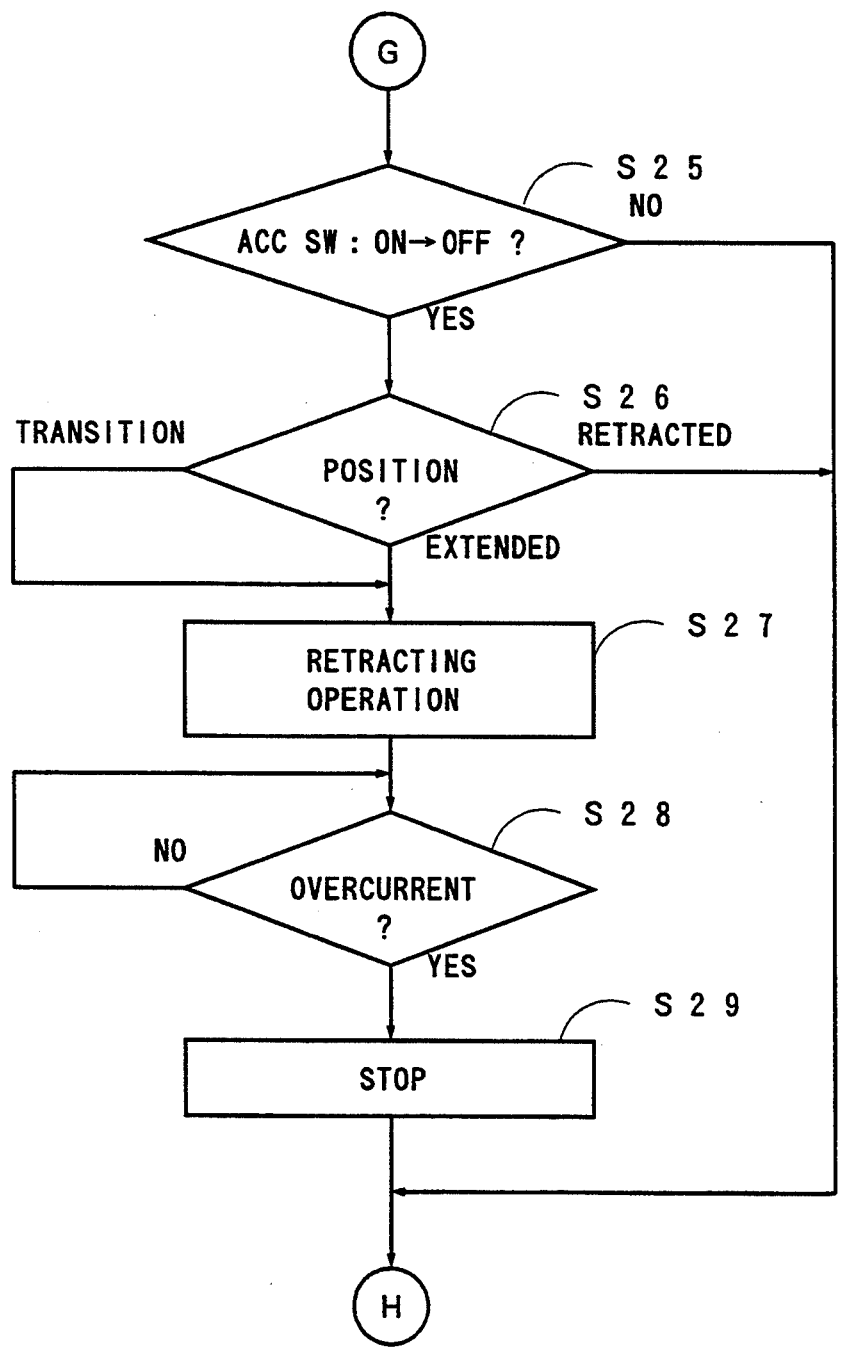
FIG. 12 is a flow chart showing the operation according to the above embodiment.

If it is determined at Step S20 that the forward movement switch 68 is OFF, the program proceeds to Step S25 in FIG. 12 where it is determined whether the ACC switch 67 has been switched from ON to OFF. If the ACC switch 67 has been switched to OFF, so that the driving signal is fed to the input port P2 through the input circuit 62, then the program proceeds to Step S26 where in response to the relative position signal fed into the input port P5, it is determined in which position the movable member 3 is positioned, out of its retracted position corresponding to its stored position PA, its extended position corresponding to its use position PB and its transitional position. If it is determined at Step S26 that the movable member 3 is positioned in its extended position or transitional position, the program proceeds to Step S27 where the signal for rotating the motor 51 in the reverse direction is fed from the output ports P7, P8 to the driving circuit 64. In response to this signal, the retracting operation of the movable member 3 is achieved at Step S27 and terminated at Steps S28, S29, as executed at Steps S4-S6. Consequently, the movable member 3 is retracted into the deflector 2 to be positioned in its stored position PA as shown in FIG. 1.

After Steps S6, S9, S14, S19, S24 and S29 were executed in the above-described operation, if it is determined at Step S11 that the movable member 3 is in its extended position, or if it is determined at Steps S16, S21 and S26 that the movable member 3 is in its retracted position, next operation will not start until each switch 66, 67, 68, 69 will be operated. Even if the reverse switch 66, ACC switch 67 or manual switch 69 is turned on during the movable member 3 is extending or retracting, the driving signal of each switch will be canceled.

As described in the above, the movable member 3 is automatically moved in response to operation of the reverse switch 66, ACC switch 67 and forward movement detection switch 68, each of which is operatively connected with the respective component. Thus, the movable member 3 may be positioned in its use position PB when it is needed, while it is positioned in its stored position PA when it is not needed, without operating the manual switch 69. As a result, the operationability for moving the movable member 3 is improved, and it is possible for the driver to avoid leaving the movable member 3 without positioning the same as desired. In the case where the movable member 3 is in its use position PB, when the vehicle 1 moves forward or when the ignition apparatus is operated to stop the engine operation, the movable member 3 will be automatically positioned in its stored position PA. Accordingly, when the vehicle 1 moves forward (i.e., when the vehicle 1 runs ordinarily), or when the ignition apparatus is operated to stop the engine operation (i.e., when the driver gets off the vehicle 1), the movable member 3 will be certainly positioned in its stored position PA, so that the running condition of the vehicle 1 will not be deteriorated, nor the movable member 3 will be damaged by a third person.

It should be apparent to one skilled in the art that the above-described embodiment is merely illustrative of but a few of the many possible specific embodiments of the present invention. Many modifications may be made by those skilled in the art without departing from the spirit and scope of the invention as defined in the following claims.

What is claimed is:

1. A retractable rear under view mirror system mounted rearward of an automotive vehicle in which a rear under field of view from a driver's seat is invisible for ensuring the rear under field of view from the driver's seat, comprising:

a base member provided rearward of said automotive vehicle;

a mirror assembly movably supported by said base member and selectively positionable from a stored position inside said base member to a use position in which the mirror assembly reflects the rear under field of view of the vehicle;

actuating means for actuating said mirror assembly to be positioned in said stored position or said use position;

detection means for detecting at least an operating condition of a component out of a plurality of components of said automotive vehicle; and control means for controlling said actuating means to move said mirror assembly to a position responsive to said operating condition of said component, wherein said control means includes;

output determination means for determining an output state of said detection means; and relative position determination means for determining a position of said mirror assembly relative to said base member;

and wherein said control means controls said actuating means in response to said relative position and said output state.

2. The retractable rear under view mirror system according to claim 1, further comprising manual switch means for manually operating to provide ON and OFF states, wherein said output determination means determines which one of said ON and OFF states said manual switch means provides, and said control means controls said actuating means in response to said relative position and all the output states determined in said output determination means.

3. The retractable rear under view mirror system according to claim 2, wherein said detection means includes means for detecting a shift change of a transmission to a reverse position thereof and a release from said reverse position, and wherein said control means controls said actuating means to cause movement of said mirror assembly to be positioned in said use position when said detection means detects said shift changes to said reverse position, and to cause movement of said mirror assembly to be positioned in said stored position when said detection means detects said release from said reverse position.

4. The retractable rear under view mirror system according to claim 2, wherein said detection means includes means for detecting a forward movement of said automotive vehicle, and wherein said control means controls said actuating means to cause movement of said mirror assembly to be positioned in said stored position when said detection means detects said forward movement of said automotive vehicle.

5. The retractable rear under view mirror system according to claim 2, wherein said detection means includes means for detecting a starting operation of said automotive vehicle, and wherein said control means controls said actuating means to cause movement of said mirror assembly to be positioned in said stored position when said detection means detects said starting operation.

6. The retractable rear under view mirror system according to claim 1, wherein said base member is a deflector mounted on said automotive vehicle in a spaced relationship therewith for deflecting air flow to a rear door of said automotive vehicle.

7. The retractable rear under view mirror system according to claim 6, wherein said deflector is mounted on said rear door at an upper portion thereof.

8. A retractable rear under view mirror system for an automotive vehicle having a rear door mounted on a vehicle body and hinged at a rear upper corner thereof, comprising:

a deflector mounted on said rear door at an upper portion thereof and in spaced relationship therewith for deflecting air flow to said rear door, said deflector having a recess formed therein;

a mirror assembly movably supported by said deflector, and being selectively positionable in a retracted position in which the mirror assembly is disposed in said recess to an extended position in which the mirror assembly is disposed out of said recess;

actuating means for actuating said mirror assembly to be positioned in said retracted position or said extended position;

detecting means for detecting at least an operating condition of a component out of a plurality of components of said automotive vehicle;

manual switch means for being manually operated to provide ON and OFF states; and control means for controlling said actuating means to move said mirror assembly to a position responsive to said operating condition of said component, wherein said control means includes;

output determination means for determining output states of said detection means and said manual switch means; and relative position determination means for determining a relative position of said mirror assembly to said deflector;

and wherein said control means controls said actuating means in response to said relative position and all the output states determined in said output determination means.

9. The retractable rear under view mirror system according to claim 8, wherein said detection means includes means for detecting a shift change of a transmission to a reverse position thereof and a release from said reverse position, and wherein said control means controls said actuating means to cause movement of said mirror assembly to be positioned in said extended position when said detection means detects said shift change to said reverse position, and to cause movement of said mirror assembly to be positioned in said retracted position when said detection means detects said release from said reverse position.

10. The retractable rear under view mirror system according to claim 8, wherein said detection means includes means for detecting a forward movement of said automotive vehicle, and wherein said control means controls said actuating means to cause movement of said mirror assembly to be positioned in said retracted position when said detection means detects said forward movement of said automotive vehicle.

11. The retractable rear under view mirror system according to claim 8, wherein said detection means includes means for detecting a starting operation of said automotive vehicle, and wherein said control means controls said actuating means to cause movement of said mirror assembly to be positioned in said retracted position when said detection means detects said starting operation.

* * * * *